United States Patent [19]

Patuzzi et al.

[11] Patent Number: 4,775,134
[45] Date of Patent: Oct. 4, 1988

[54] ARRANGEMENT FOR PREHEATING SCRAP

[75] Inventors: Alexander Patuzzi, Grammastetten; Rupert Berger, Linz, both of Austria

[73] Assignee: Voest-Alpine Aktiengesellschaft, Linz, Austria

[21] Appl. No.: 34,658

[22] Filed: Mar. 31, 1987

[30] Foreign Application Priority Data

Apr. 28, 1986 [EP] European Pat. Off. ........ 86890116.6

[51] Int. Cl.⁴ .............................................. C21C 5/38
[52] U.S. Cl. .................... 266/155; 266/159; 266/901
[58] Field of Search ............... 266/155, 158, 159, 175, 266/901

[56] References Cited

U.S. PATENT DOCUMENTS 3,424,445  1/1969  Longenecker ...................... 266/159
3,479,178 11/1969  Bowden .............................. 266/901

FOREIGN PATENT DOCUMENTS 18843  5/1971  Japan ................................... 266/901
 9009  1/1976  Japan ................................... 266/155

Primary Examiner—R. Dean
Assistant Examiner—Robert L. McDowell
Attorney, Agent, or Firm—Hopgood, Calimafde, Kalil, Blaustein & Judlowe

[57] ABSTRACT

An arrangement for preheating scrap includes a scrap treating furnace into which at least one exhaust gas duct from a metallurgical furnace enters. In order to attain a higher efficiency in preheating, the scrap treating furnace has a through chamber for a plurality of adjacently arranged or superposed scrap receiving vessels. Each of these vessels is provided with its own gas inlet opening and with its own gas exit opening. The scrap treating furnace also includes a charging means on one end of the through chamber to receive at least one scrap receiving vessel and a discharging means on the other end of the through chamber to receive at least one scrap receiving vessel. A conveying means for moving the scrap receiving vessels in cycles from the charging means to the discharging means as well as gas conducting means for connecting the gas exit openings with the gas inlet openings of neighboring scrap receiving vessels are arranged within the through chamber.

15 Claims, 3 Drawing Sheets

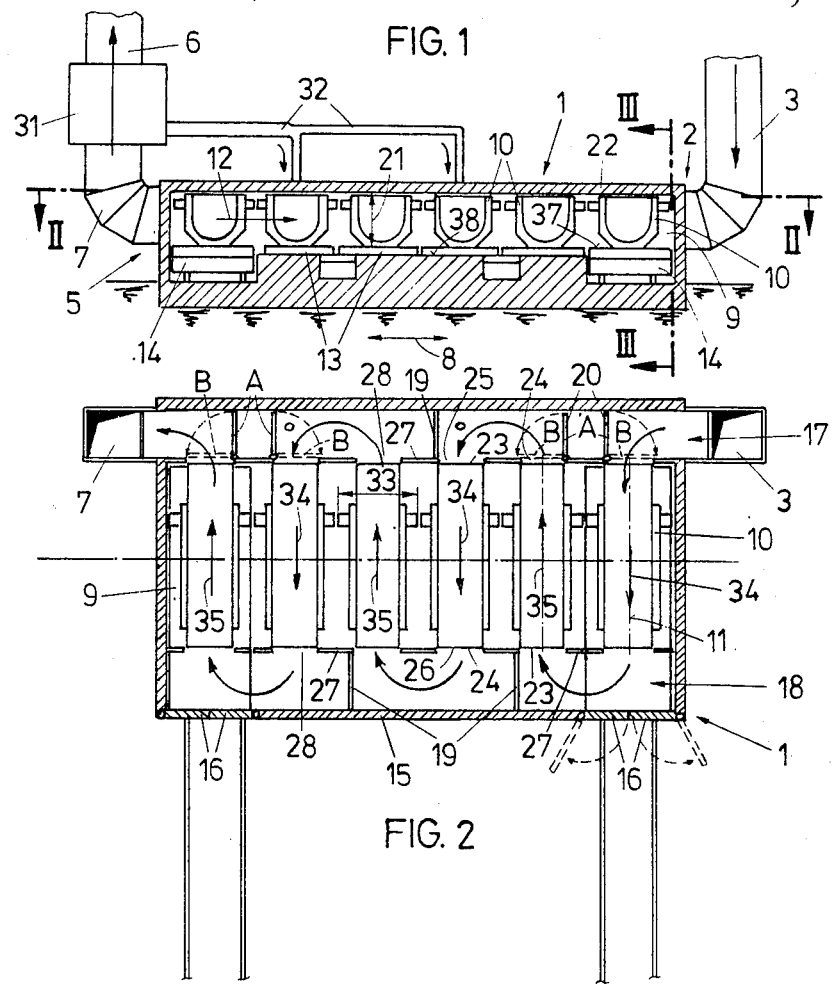
FIG. 1
FIG. 2
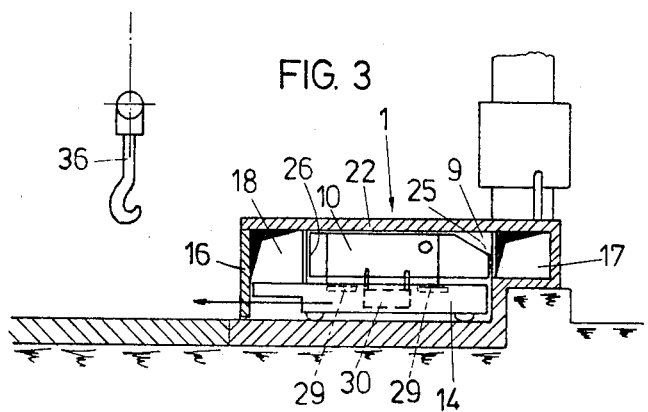
FIG. 3

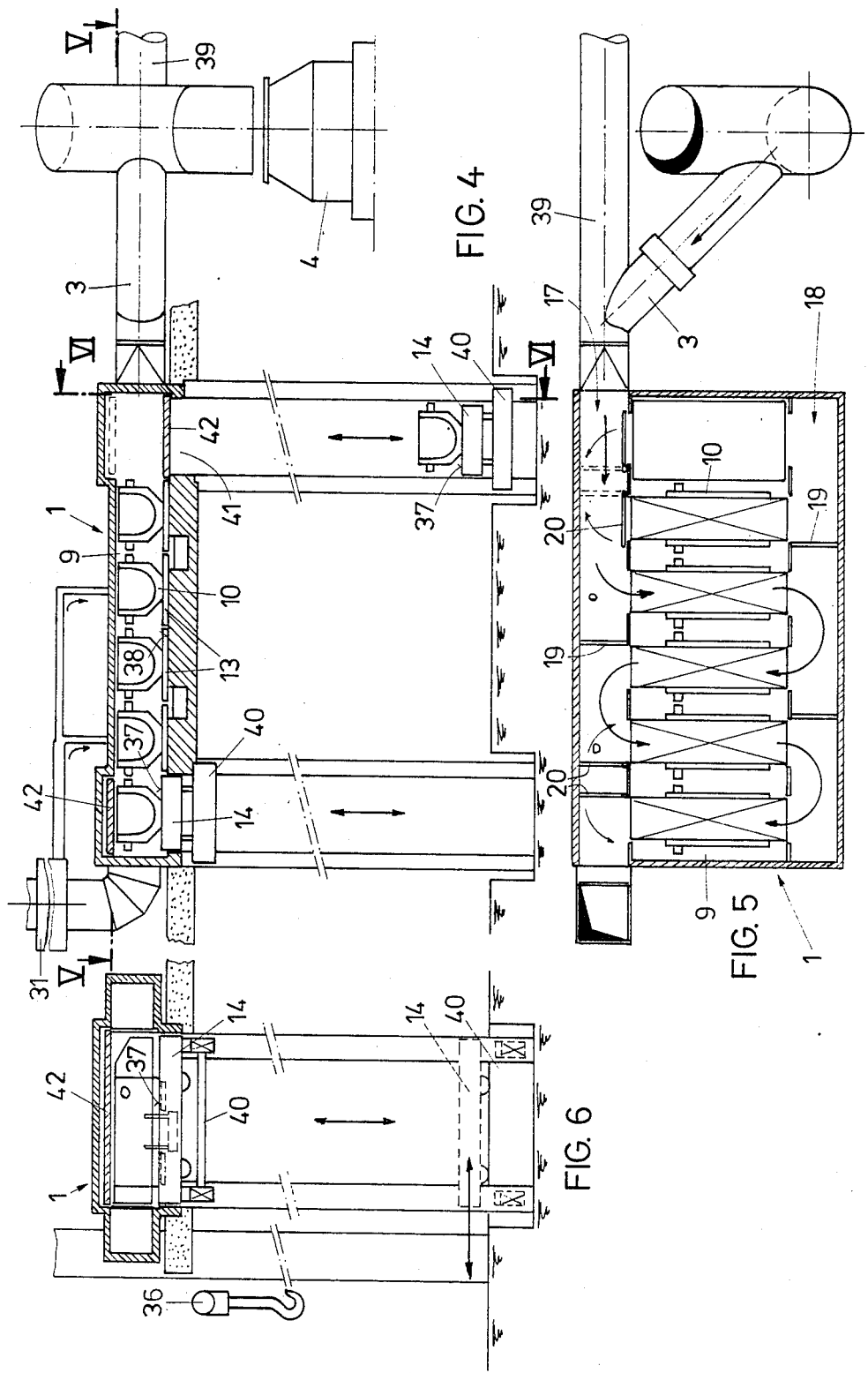

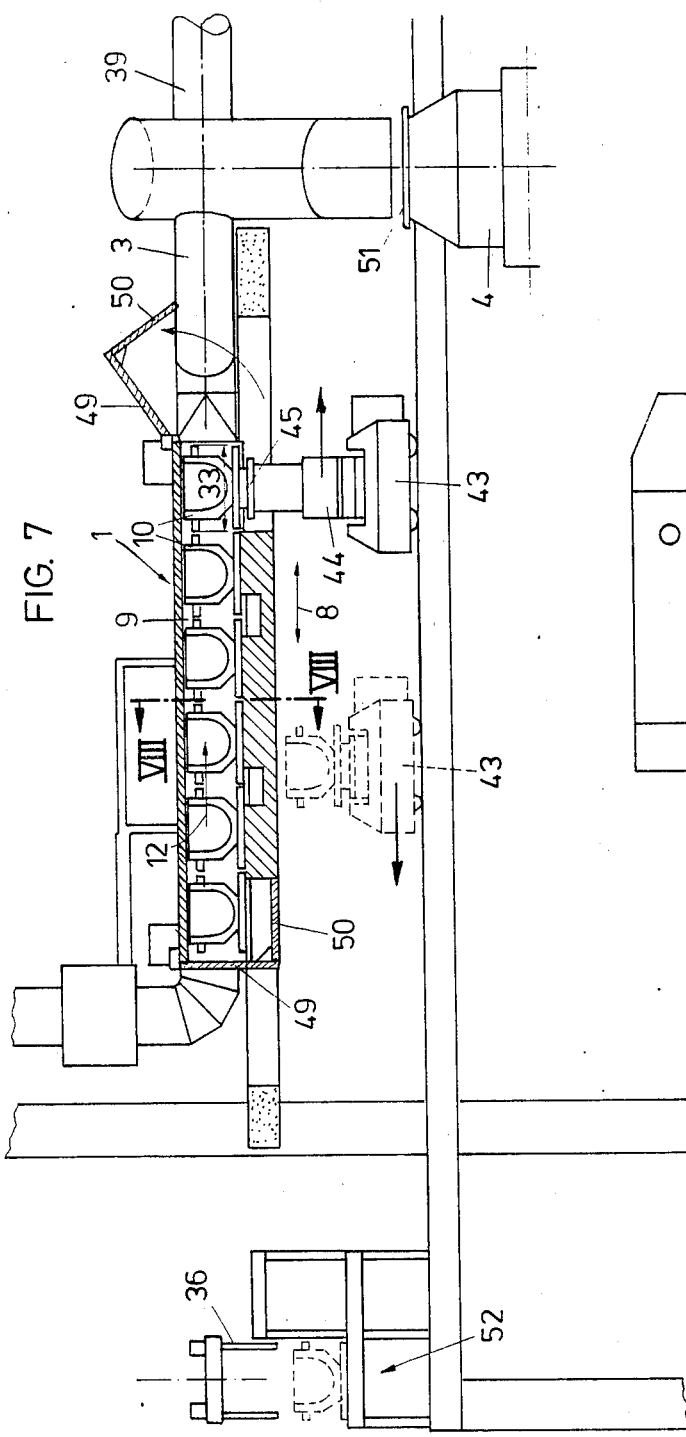

ARRANGEMENT FOR PREHEATING SCRAP

The invention relates to an arrangement for preheating scrap, comprising a scrap treating furnace into which at least one exhaust gas duct from a metallurgical furnace, in particular a converter, enters.

To preheat scrap, it is known to charge the scrap into the converter and to heat the same within the converter by supplying fuel gases. In doing so, a satisfactory efficiency will be obtained merely with bottom-blowing converters, because complete sweeping of the scrap with fuel gases is feasible only with such converters. With top-blowing converters (LD-converters), it is necessary to charge the scrap in several batches and to preheat each batch by means of specially installed burner lances. However, sweeping of the scrap is inadequate, with long charging periods resulting.

Since the time interval between consecutive charges is prolonged by preheating the scrap in the converter, it was started to preheat the scrap outside of the converter, wherein it is known to employ separate externally heated furnaces. With such furnaces, the heat transfer substantially is effected by radiation of the heating gas.

With the automatically adjusting disposition in layers of the scrap within the furnace, it is only the uppermost scrap layer facing the fuel gas that is heated to a sufficient extent, so that only a low efficiency will be attained. This may be improved by employing a rotary tubular kiln, yet expensive preparation of the scrap is required in order that re-layering of the scrap and its transport within the rotary tubular furnace are possible.

A scrap treating furnace of the initially defined kind, through which the exhaust gases from an electric furnace are conducted, is known from Iron and Steel Engineer, November 1983, p. 56, FIG. 3. Again, problems of low efficiency on account of random layering of the scrap within the scrap treating furnace are involved.

The invention aims at avoiding these disadvantages and difficulties and has as its object to provide an arrangement of the initially described kind, in which the exhaust gases from a metallurgical furnace may be utilized to preheat scrap, yet with a higher efficiency being ensured.

According to the invention, this object is achieved in that the scrap treating furnace comprises a through chamber for a plurality of adjacently arranged or superposed scrap receiving vessels, each of which is provided with its own gas inlet opening and with its own gas exit opening, which scrap treating furnace comprises a charging means on one end of the through chamber to receive at least one scrap receiving vessel and a discharging means on the other end of the through chamber to receive at least one scrap receiving vessel, and that a conveying means for moving the scrap receiving vessels in cycles from the charging means to the discharging means as well as gas conducting means for connecting the gas exit openings with the gas inlet openings of neighboring scrap receiving vessels are arranged within the through chamber.

Re-layering of the scrap during charging into, and discharging from, the scrap treating furnace, or prior to charging the metallurgical furnace, preferably is obviated by designing the scrap receiving vessels als scrap chutes, which are provided with a gas-permeable wall, preferably with a grid or grate, on their end arranged opposite the open end.

A preferred embodiment, which results in a particularly compact construction of the scrap treating furnace, is characterized in that the scrap treating furnace includes two longitudinal channels, one of which is each positioned laterally of, and parallel to, the through chamber, each longitudinal channel being equipped with gas conducting means.

Suitably, the scrap chutes are placed in the through chamber with their longitudinal axes transverse to the conveying direction of the scrap chutes, lying with their two ends at gas passage openings connecting the through chamber with the longitudinal channels.

A fluidically favorable mode of construction advantageously is obtained by designing the gas conducting means as walls blocking the longitudinal channels after every second scrap chute, wherein one wall each of one longitudinal channel is arranged approximately in the middle between two neighboring walls of the other longitudinal channel. Thereby, it is possible to conduct the waste air from the metallurgical furnace continuously through the adjacently disposed scrap chutes, wherein, however, the furnace may be designed to be short and a particularly effective utilization of the exhaust gases as a result of the short path to be followed by the exhaust gases is ensured.

Preferably, the charging and discharging means are each designed as a carriage entering the scrap treating furnace transversely to the conveying direction of the scrap receiving vessels in the through chamber, the carriage platforms forming part of the furnace bottom, thus rendering charging and discharging of the scrap treating vessels quick and easy.

In order to be able to introduce the exhaust gases from the metallurgical furnace into the scrap treating furnace over a particularly short way by largely avoiding thermal losses, the scrap treating furnace suitably is arranged at a level above the metallurgical furnace.

Therein, the charging and discharging means advantageously each comprise a lifting means to be lifted towards the scrap treating furnace in a vertical direction transverse to the conveying direction of the scrap receiving vessels in the through chamber and accommodating the carriage.

According to a further preferred embodiment, the charging and discharging means are designed as lifting trucks displaceable below the scrap treating furnace in the horizontal direction parallel to the conveying direction of the scrap receiving vessels in the through chamber, each comprising a lifting platform to be moved as far as into the interior of the scrap treating furnace.

In order not to suffer gas losses as far as possible during charging and discharging, the gas conducting means arranged next to the ends of a longitudinal channel suitably are designed as movable walls, in particular as pivotable flaps, which are movable from a position blocking the longitudinal channel into a position clearing the longitudinal channel, and vice versa.

In order to enable burning of the CO portion of the converter exhaust gas, a heat exchanger advantageously is provided at a gas discharge from the scrap treating furnace, which serves to preheat air and from which hot-air conducting pipes enter into the interior of the scrap treating furnace.

The invention will now be explained in more detail by way of three embodiments and with reference to the accompanying drawings, wherein:

FIG. 1 is a longitudinal section through an arrangement of the invention according to a first embodiment;

FIG. 2 is a section along line II—II of FIG. 1;

FIG. 3 is a section along line III—III of FIG. 1;

FIGS. 4 to 6 show a further embodiment in illustrations analogous to FIGS. 1 to 3;

FIG. 7 shows a third embodiment in an illustration analogous to FIG. 1; and

FIG. 8 illustrates a detail of FIG. 7 on an enlarged scale and in side view.

A scrap treating furnace is generally denoted by 1. On one of its ends 2, an exhaust gas duct 3 from a converter 4 (cf. FIG. 4) enters, and on its other end 5, a discharge duct 7 for the exhaust gas conducted through the scrap treating furnace follows, connected to a stack 6. The scrap treating furnace 1 comprises a central through chamber 9 extending in its longitudinal direction 8 and accommodating scrap receiving vessels designed as scrap chutes 10. The scrap chutes 10 are placed in the scrap treating furnace 1 with their longitudinal axes 11 transverse to the longitudinal direction 8 of the same. They are moved in cycles through the through chamber 9 in the direction illustrated by arrow 12, by conveying means 13, for instance, designed as walking beam conveyors.

A carriage 14 arranged to be displaceable transversely to the conveying direction 12 on either end 2, 5 of the scrap treating furnace 1 serves to charge and discharge the scrap chutes 10. The carriages 14 are movable as far as into the through chamber 9; for this purpose, the insulated external wall 15 of the scrap treating furnace includes entry doors 16.

On both sides of the through chamber 9, one longitudinal channel 17, 18 is each arranged parallel to the same within the external wall 15, their cross sections corresponding approximately to that of a scrap chute 10. The exhaust gas duct 3 enters into one of these longitudinal channels 17 on one end of the scrap treating furnace; the discharge duct 7 follows upon the opposite end of this longitudinal channel 17. Within the longitudinal channels, gas conducting means 19, 20 are provided, which are designed as walls 17, 18 disposed transverse to the longitudinal direction of the longitudinal channels. One wall 19 is each arranged after two neighboring scrap chutes 10, one wall 19, 20 each, of one longitudinal channel 17, being arranged approximately in the middle between two neighboring walls 19 of the other longitudinal channel 18. Thereby, as is apparent particularly from FIG. 2, a meander-like passage of the exhaust gas from the converter 4 through all of the scrap chutes 10 introduced in the scrap treating furnace 1 is provided.

The height 21 of the through chamber 9 of the scrap treating furnace 1 is chosen such that the upper edges of the scrap chutes 10 come to lie just closely below the ceiling 22 of the furnace 1, yet conveyance by means of the conveying means 13 is feasible.

The scrap chutes include a gas inlet opening 23 and a gas exit opening 24 on the opposite end, one of these openings being formed by the free end 25 of the scrap chute 10 and the opposite opening being formed by a gas-permeable wall 26, preferably a grid or grate-like wall.

The longitudinal channels 17, 18 are separated relative to the through chamber 9 by means of longitudinal walls 27 including gas passage openings 28, whose cross sections are adapted to the free cross sections of the scrap chutes 10. The gas passage openings 28 are each arranged at the distance of two neighboring scrap chutes 10 such that no gases may flow through between the scrap chutes 10.

Rolls 29 arranged at the carriage 14 allow for the transverse transport of a scrap chute 10 from one of these carriages 14 onto the conveying means 13 or from the latter onto one of these carriages 14, the transverse transport being effected by a displacement means 30 stationarily arranged on the carriage 14.

As is apparent from FIG. 2, the gas conducting means 20 arranged on the ends of the longitudinal channel 17 into which the exhaust gas duct 3 enters are designed as pivotable flaps, which are movable from a position A blocking the longitudinal channel 17 into a position B clearing the longitudinal channel, and vice versa, in a manner that the first and the last two places for the scrap chutes 10 will not be swept over by the exhaust gas during charging and discharging. Thus, it is possible to prevent any gas loss during charging and discharging.

The discharge duct 7 is provided with a heat exchanger 31 to preheat air. The air heated in the heat exchanger 31 is fed into the interior of the scrap treating furnace 1 via hot-air conducting pipes 32 in order to burn the CO portion contained in the converter exhaust gas. The plastics and oil residues heated during preheating of the scrap commonly with the same and their vapors developing during preheating thereby may also be burnt purposefully.

Due to the movement of the scrap chutes in cycles each by an extent corresponding to the width 33 of a scrap chute 10, the scrap chutes 10 are passed through by the converter gas once in one direction 34 and once in the opposite direction 35 in a manner that the opening of a scrap chute 10 initially functioning as gas inlet opening 23 subsequently serves as gas exit opening 24, and vice versa. This periodic alternation of the flow direction effects an all-over sweeping and, thus, a uniform heating of the scrap.

Suitably, guide plates (not illustrated) are arranged at the scrap chutes 10 in a manner that deviations of the exhaust gas flow from the desired direction—i.e., the longitudinal axis 11 of the scrap chutes 10—are largely prevented. The scrap chutes 10 are made of a high-temperature material.

Along with the cyclic advance of the scrap chutes, charging and discharging of one scrap chute each is effected.

The disposition of the scrap treating furnace 1 on the mill floor as illustrated in FIG. 1 offers the advantage of simple charging and discharging. The scrap chute 10 filled on the scrap site is deposited onto the carriage 14 by a scrap crane 36 and is moved by the carriage to the scrap treating furnace 1. Within the furnace, the carriage platform 37 forms part of the furnace bottom 38. After discharging of a scrap chute 10 and moving up of the scrap chutes 10 in the through chamber by one place (in counterflow to the converter exhaust gas passage), the last introduced scrap chute 10, by the displacement means 30, is placed from the carriage 14 onto the transport means 13 arranged within the scrap treating furnace such that the carriage 14 is able to leave the furnace with a view to recharging a scrap chute 10.

According to the embodiment illustrated in FIGS. 4 to 6, the scrap treating furnace 1 is arranged at a level above the converter 4. Thereby, it is possible to feed the converter exhaust gases over a short way directly to the scrap treating furnace 1 via the exhaust gas duct 3. The exhaust gas duct 3 enters into a main exhaust gas duct 39 coming from other converters so that feeding of the scrap treating furnace 1 with converter exhaust gas is feasible as continuously as possible.

The charging and discharging means in this case is each designed as a lifting means 40 vertically movable transversely to the conveying direction 12 of the scrap chutes 10 in the through chamber, onto which a carriage 14 loaded with a scrap chute may be moved. When lifting the carriage 14, the latter gets into the through chamber 9 through a bottom opening 41 of the scrap treating furnace. The carriage platform 37, upon introduction of the carriage 14 into the scrap treating furnace 1, again forms part of its bottom 38. If the carriages 14 are outside of the scrap treating furnace 1 during charging and discharging, its bottom openings 41 are closed by vertically liftable and lowerable lids 42.

The embodiment illustrated in FIG. 7 comprises a lifting truck 43 as charging and discharging means, which is displaceable below the scrap treating furnace 1 in the horizontal direction and parallel to the conveying direction 12 of the scrap chutes 10 in the through chamber 9. The lifting truck is provided with a lifting mechanism 44, which comprises a lifting platform 45 supporting the scrap chute 10. Within the scrap treating furnace 1, guide rails 47 equipped with rollers 46 are provided, which are laid along the bottom plates 48 of the scrap chutes 10. Charging and discharging of the scrap chutes is effected by threading the bottom plates 48 of the scrap chutes 10 into these guide rails 47 by displacing the lifting truck 43 in the longitudinal direction 8 of the scrap treating furnace 1. To this end, the end walls 49 of the through chamber may be pivoted up commonly with a bottom part 50 whose width corresponds to the width 33 of a scrap chute 10.

By means of the lifting truck 43, a scrap chute 10, upon discharging, may be moved directly to the converter mouth 51, and the scrap may be filled into the converter 4 by tilting the scrap chute 10. After emptying of the scrap chute 10, the lifting truck 43 moves under the scrap treating furnace 1 as far as to a side stand 52 located in the region of cranes 36, where the empty scrap chute 10 is replaced with a newly filled scrap chute 10.

The invention is not limited to the embodiments illustrated, but may be modified in various aspects. For instance, it is possible to charge and discharge several scrap chutes 10 simultaneously, which scrap chutes may be arranged adjacent each other or in a superposed manner.

What we claim is:

1. In an arrangement for preheating scrap including a scrap treating furnace and, a metallurgical furnace, at least one exhaust gas duct from said metallurgical furnace entering into said scrap treating furnace, the improvement wherein said scrap treating furnace comprises a through chamber having two ends and a plurality of scrap receiving vessels capable of being deposited in said through chamber, each of said scrap receiving vessels having its own gas inlet opening and its own gas exit opening, a charging means provided on one of said two ends of said through chamber to receive at least one of said scrap receiving vessels, a discharging means provided on the other of said two ends of said through chamber to receive at least one of said scrap treating vessels, a conveying means arranged within said through chamber to move said scrap receiving vessels in cycles from said charging means to said discharging means, and a gas conducting means to connect said gas exit opening of one of said scrap receiving vessels with said gas inlet opening of the neighboring one of said scrap receiving vessels.

2. An arrangement as set forth in claim 1, wherein said scrap receiving vessels are designed as scrap chutes each having an open end and a gas-permeable wall provided on its end opposite said open end.

3. An arrangement as set forth in claim 2, wherein said gas-permeable wall is a grid.

4. An arrangement as set forth in claim 2, wherein said gas-permeable wall is a grate.

5. An arrangement as set forth in claim 1 or 2, wherein said scrap treating furnace includes two longitudinal channels, arranged on either side of, and parallel to, said through chamber, and a gas conducting means provided for each of said longitudinal channels.

6. An arrangement as set forth in claim 2, wherein said scrap treating furnace includes two longitudinal channels, arranged on either side of, and parallel to, said through chamber, and a gas conducting means provided for each of said longitudinal channels, and further comprising gas passage openings connecting said through chamber with said longitudinal channels, and wherein said scrap chutes, within said through chamber, are deposited with their longitudinal axes transverse to the conveying direction of said scrap chutes and with their two ends at said gas passage openings.

7. An arrangement as set forth in claim 6, wherein said gas conducting means is comprised of walls blocking said longitudinal channels after every second scrap chute, one wall each of one of said longitudinal channels being arranged approximately centrally between two neighboring walls of the other of said longitudinal channels.

8. An arrangement as set forth in claim 1, further including a furnace bottom, and wherein each of said charging and discharging means is designed as a carriage adapted to be moved into said scrap treating furnace transverse to the conveying direction of the scrap receiving vessels in said through chamber, said carriage having a carriage platform constituting part of said furnace bottom.

9. An arrangement as set forth in claim 1, wherein said scrap treating furnace is arranged at a level above said metallurgical furnace.

10. An arrangement as set forth in claim 8, wherein said scrap treating furnace is arranged at a level above said metallurgical furnace and each of said charging and discharging means comprises a lifting means adapted to be lifted in a vertical direction transverse to the conveying direction of said scrap receiving vessels in said through chamber towards said scrap treating furnace, lifting said carriage.

11. An arrangement as set forth in claim 1, wherein each of said charging and discharging means is designed as a lifting truck adapted to be displaced below said scrap treating furnace in a horizontal direction parallel to the conveying direction of said scrap receiving vessels in said through chamber and having a lifting platform to be movable as far as into said scrap treating furnace.

12. An arrangement as set forth in claim 5, wherein the gas conducting means arranged next to the ends of a longitudinal channel are designed as movable walls adapted to be moved from a position blocking said longitudinal channel into a position clearing said longitudinal channel, and vice versa.

13. An arrangement as set forth in claim 12, wherein said movable walls are designed as pivotable flaps.

14. An arrangement as set forth in claim 1, further comprising a gas discharge duct leading off said scrap treating furnace, a heat exchanger provided in said gas discharge duct for preheating air, and hot-air conducting pipes leading from said heat exchanger into said scrap treating furnace.

15. An arrangement as set forth in claim 8, 9, 10, 11 or 14, wherein said scrap receiving vessels are designed as scrap chutes each having an open end and a gas-permeable wall provided on its end opposite said open end.

* * * * *